United States Patent [19]

Miyakawa

[11] 4,147,460
[45] Apr. 3, 1979

[54] METHOD FOR PIERCING DOUBLING PLATE FOR H-BEAM AND TOOL FOR PROCESSING DOUBLING PLATE FOR H-BEAM

[75] Inventor: Eiji Miyakawa, Tokyo, Japan

[73] Assignee: Miyakawa Industry Company Limited, Seki, Japan

[21] Appl. No.: 840,678

[22] Filed: Oct. 11, 1977

[30] Foreign Application Priority Data

Nov. 8, 1976 [JP] Japan ................................. 51/133947

[51] Int. Cl.² .......................... B23B 35/00; B23Q 3/06
[52] U.S. Cl. ...................................... 408/1 R; 269/41; 269/293; 269/296; 269/303; 408/39; 408/103
[58] Field of Search ...................... 408/1, 37, 39, 103, 408/108, 115 R, 241 R, 241 G; 269/41, 289 R, 290-301, 303-306, 309

[56] References Cited

U.S. PATENT DOCUMENTS

| 919,823 | 4/1909 | Childs | 408/39 |
| 2,302,878 | 11/1942 | Muhl et al. | 408/108 |

FOREIGN PATENT DOCUMENTS

2248903  5/1975  France ..................... 269/295

*Primary Examiner*—Robert Louis Spruill
*Attorney, Agent, or Firm*—George B. Oujevolk

[57] ABSTRACT

A method for piercing a double plate for an H-beam by utilizing a multiple spindle H-beam piercing mill capable of piercing both flange portions and a web portion of the H-beam and a tool having a substantially H-shaped section and capable of being mounted on this piercing mill, in which the double plate for the H-beam is fixed to the tool and the double plate is pierced by the same drill arrangement as used for processing of the H-beam to which the double plate is to be attached.

18 Claims, 14 Drawing Figures

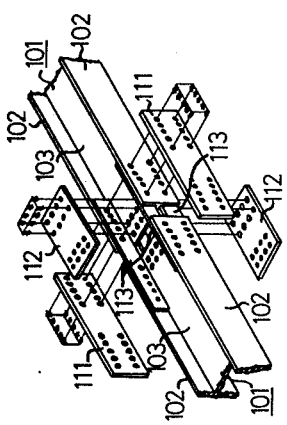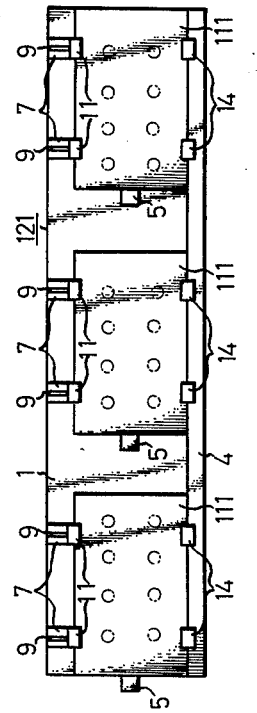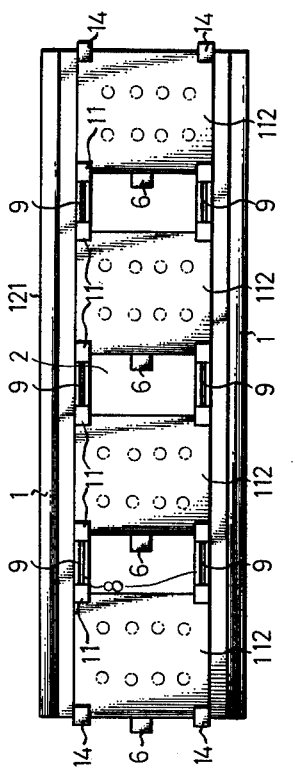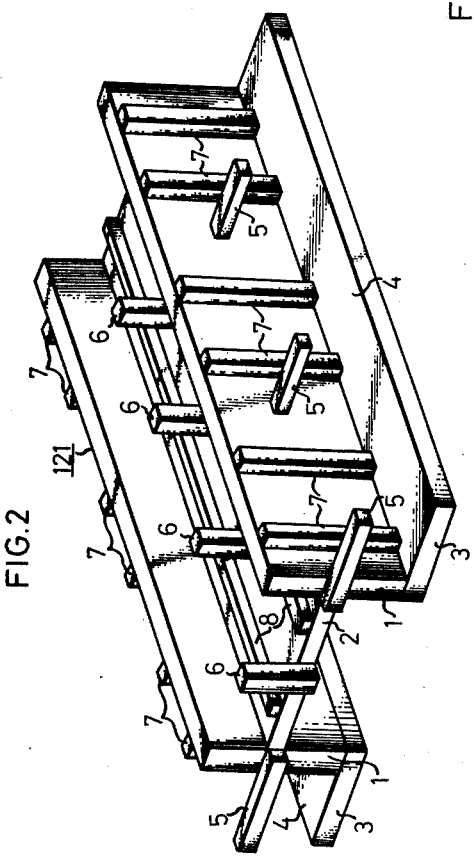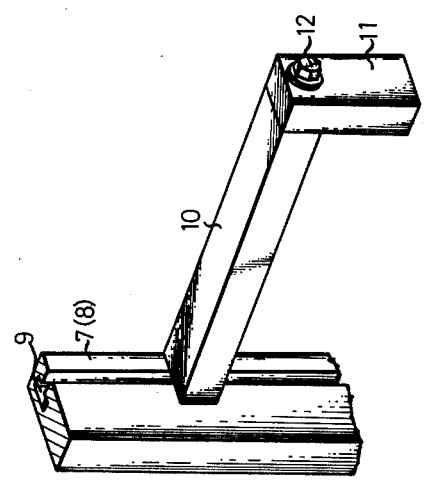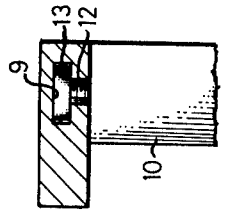

METHOD FOR PIERCING DOUBLING PLATE FOR H-BEAM AND TOOL FOR PROCESSING DOUBLING PLATE FOR H-BEAM

BACKGROUND OF THE INVENTION (1) Field of the Invention

The present invention relates to a method for piercing a double plate for connectin of H-beams and a tool to be used for practising this piercing method.

(2) Description of the Prior Art

In general, as shown in FIG. 1, double plates for H-beams include a relatively long outer flange double plate 111 for connecting two H-beams 101 at left and right flange portions 102 on outer sides thereof, a narrow-width inner flange double plate 113 for connecting the flange portions 102 on inner sides thereof, and a relatively short web double plate 112 for connecting web portions 103 on both the upper and lower sides thereof.

These flange double plates and web double plates have heretofore been pierced and drilled one by one by a boring mill or the like. Accordingly, this processing operation is quite different from the operation of piercing and drilling H-beams 101 to which the double plates are to be attached, and these two operations are conducted separately. According to such conventional technique, the operation of piercing and drilling double plates one by one is very troublesome and it frequently happens that the hole arrangement is deviated among the drilled double plates and between the double plates and the H-beams and it becomes impossible to insert connecting bolts.

OBJECTS OF THE INVENTION

It is a primary object of the present invention to provide a piercing method in which double plates for connection of H-beams can be pierced and drilled very simply and precisely.

Another object of the present invention is to provide a piercing method in which double plates for connection of H-beams can be continuously pierced and drilled very simply and precisely.

Still another object of the present invention is to provide a tool for processing double plates, by which double plates for connection of H-beams can be pierced and drilled very simply and precisely.

A further object of the present invention is to provide a tool for processing double plates, by which the position for setting a double plate to the tool can optionally be determined and adjusted.

A still further object of the present invention is to provide a tool for processing double plates which is arranged so that while a double plate is being drilled, the top ends of the drills of a multiple spindle H-beam piercing mill are prevented from impinging against the double plate processing tool.

A still further object of the present invention is to provide a tool for processing double plates, by which even a double plate having concave and convex end faces can be stably supported on a setting portion.

A still further object of the present invention is to provide a tool for processing double plates, by which the attachment position of a double plate on the tool can easily be determined.

A still further object of the present invention is to provide a tool for processing double plates, in which the relative position of the tool to a multiple spindle H-beam piercing mill can easily be determined precisely.

Other objects of the present invention will be apparent from understanding of embodiments illustrated hereinafter and will be described in the appended claims. Further, many advantages not mentioned in the specification will be apparent to those skilled in the art when the present invention is worked.

BRIEF DESCRIPTION OF THE DRAWING

FIG. 1 is a perspective view illustrating the manner of the use of double plates together with H-beams in the dismantled state.

FIG. 2 is a partially cut-out perspective view showing a first embodiment of the tool of the present invention.

FIG. 3-A is an enlarged partial perspective view showing the relation between a clearance fitting and a supporting rod in the tool of the first embodiment shown in FIG. 2.

FIG. 3-B is a plane view showing the relation illustrated in FIG. 3-A.

FIG. 4-A is a side view illustrating the state where an outer flange double plate is fixed to the tool of the first embodiment.

FIG. 4-B is a partially cut-out plane view illustrating the state where a web double plate is fixed to the tool of the first embodiment.

DETAILED DESCRIPTION OF THE PREFERRED EMBODIMENTS

Figure 7:
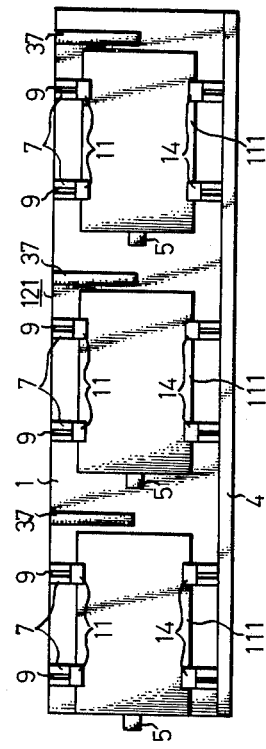
FIG. 7 is a side view showing another example of the tool of the first embodiment together with double plates.

The first embodiment of the present invention will now be described by reference to FIGS. 2 to 6.

Reference numeral 121 represents a processing tool according to the present invention. The tool 121 comprises a pair of left and right side plates 1 extending in the vertical direction and a supporting plate 2 extending in the horizontal direction to connect both the side plates 1 at the center with respect to the direction of the height. Accordingly, a portion defined by the supporting plate 2 and side plates 1 has the same shape as that of an ordinary H-beam along a certain length. A pair of setting plates 3 are outwardly projected from the lower faces of the side plates 1, and portions of the setting plates 3 located outside the side plates 1 are referred to as "setting portions 4". A plurality of butting fittings 5 and 6 are fixed to the front end faces and outer side faces of the side plates 1 and to the top end faces and top faces of the supporting plate 2 and they are projected outwardly and upwardly, respectively. The outer ends of the butting fittings 5 are retreated inwardly as compared with outer edges of the setting portions 4. The top ends of the butting fittings 6 are located below the top ends of the side plates 1. Two clearance fittings 7 are disposed in the rear of each butting fitting 5, and they extend in the longitudinal direction along the entire height of the side plate 1. A pair of clearance fittings 8 similar to the clearance fittings 7 are fixed to both the left and right sides of the top face of the supporting plate 2, and they extend along the entire length of the supporting plate 2. These clearance fittings 7 and 8 are disposed for escape of the drill.

Reference numeral 9 represents a T-shaped groove formed on each of the clearance fittings 7 and 8 and is opened on the outer side and the top face as shown in FIG. 3-A. Each T-shaped groove 9 extends along the entire length of the clearance fitting 7 or 8. Supporting rods 10 are attached to the outer side faces of the clearance fittings 7 and the top faces of the clearance fittings 8 so that they extend outwardly and upwardly, respectively. A fixed plate 11 is attached to the top end of each supporting rod 10. A long bolt 12 is inserted into the supporting rod 10 and fixed plate 11 from the upper portion of the outer side face of the fixed plate 11 to pierce the supporting rod and fixed plate 11 and the bolt 12 is screwed into a nut 13 fitted in the T-shaped groove 9 as shown in FIG. 3-B. Accordingly, thus supporting rod 10, fixed plate 11, bolt 12 and nut 13 constitute fixing means for fixing a double plate.

The length of the supporting rod 10 is slightly smaller than the entire thickness of a double plate to be piled on the outer side or top face of the clearance fitting 7 or 8. The fixed plate 11 mounted on the outside of the clearance fitting 7 is disposed downwardly as shown in FIG. 4-A, and the fixed plates 11 mounted in the upper portions of the clearance fittings 8 are arranged so that, as shown in FIG. 4-B, the foremost plate 11 faces frontward and in the subsequent fixed plates 11, the facing directions are reversed alternately.

As shown in FIGS. 4-A and 4-B, similar fixed plates 14 are mounted on the setting portion 4 for the tool 121 at positions corresponding to those of the fixed plates 11 on the outer sides of the side plates 1 and at positions corresponding to the fixed plates 11 on the upper portions of the supporting plates 2.

Figure 6:
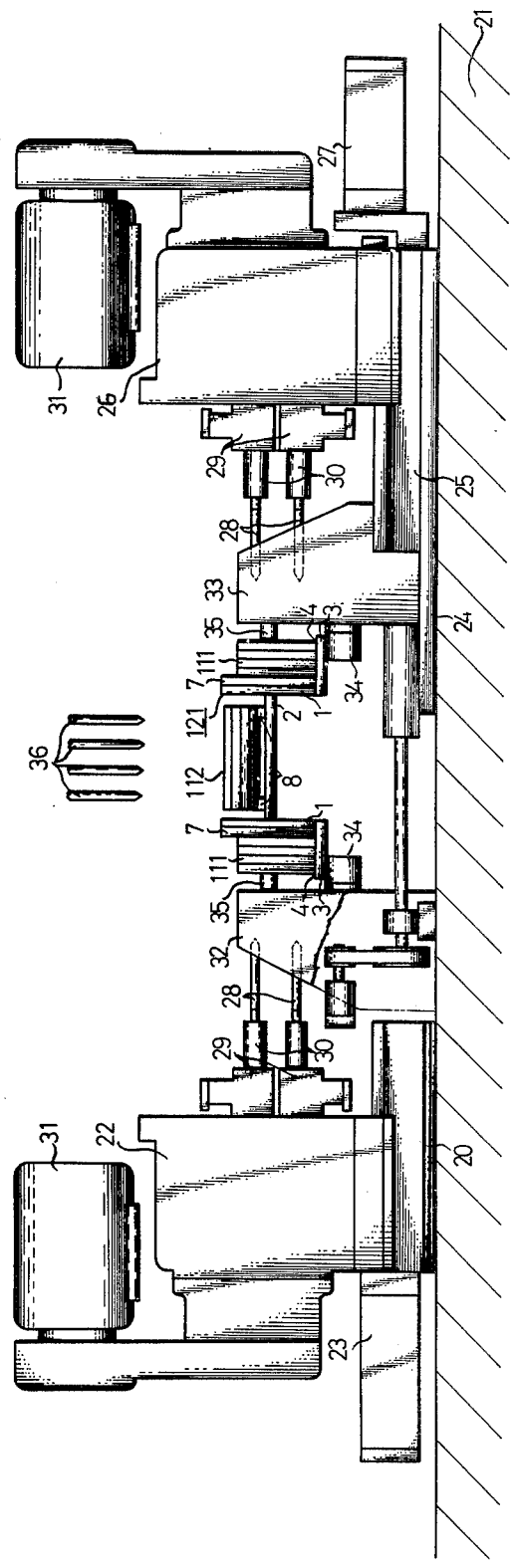
FIG. 6 is a front view showing a part of a multiple spindle H-beam piercing mill that is used in combination with the tool of the present invention.

The double plate processing tool of the present invention having the above structure should be used in combination with a multiple spindle H-beam piercing mill as shown in FIG. 6. Accordingly, this piercing mill will now be described briefly.

Referring to FIG. 6, a guide member 20 is mounted on the left side of a machine stand 21 of the piercing mill, and a left gear box 22 is mounted on the guide member 20 and is moved to the left and right along the guide member 20 by a hydraulic cylinder 23 disposed on the left end of the guide member 20. A guide rail 24 corresponding to the guide member 20 is laid out on the machine stand 21 on the right side thereof, and a guide member 25 is supported on the guide rail 24 so that it can be moved to the left and right. A right gear box 26 is mounted on the guide member 25 and like the above-mentioned left gear box, it is moved to the left and right by a hydraulic cylinder 27 disposed on the right end of the guide 25. A plurality of drills 28 are disposed laterally in upper and lower two stages on the left side face of the right gear box 26 and on the right side face of the left gear box 22 through pairs of upper movable members 29 and lower drill-fitting spindles 30. These drills 28 correspond to one another and they are simultaneously rotated by motors 31 disposed above the gear boxes 22 and 26. The vertical position of each drill 28 can optionally be adjusted. A pair of facing left and right, fixed and movable gripping members 32 and 33 are mounted on the machine stand 21 in the right of the guide member 20 and on the top face of the left end of the guide member 25, respectively, and a plurality of supporting rollers 34 for supporting an H-beam are attached to each of the confronting faces of the gripping members 32 and 33. Heel blocks 35 are projected from the top ends of the confronting faces of the gripping members 32 and 33 so that they face the flange portions of the H-beam.

A plurality of drills 36 corresponding to the lateral drills 28 are disposed above between the fixed and movable gripping members 32 and 33, and they are arranged downwardly in one row or two rows. When they are arranged in one row, they are fixed, and when they are fixed in two rows, their positions can be adjusted in front and in rear. These drills 36, like the drills 28, are mounted on the lower face of a vertical gear box (not shown) arranged movably in the vertical direction, through movable members and drill-fitting spindles.

The operation of piercing double plates by the multiple spindle H-beam piercing mill while utilizing the above-mentioned tool will now be described.

Figure 5:
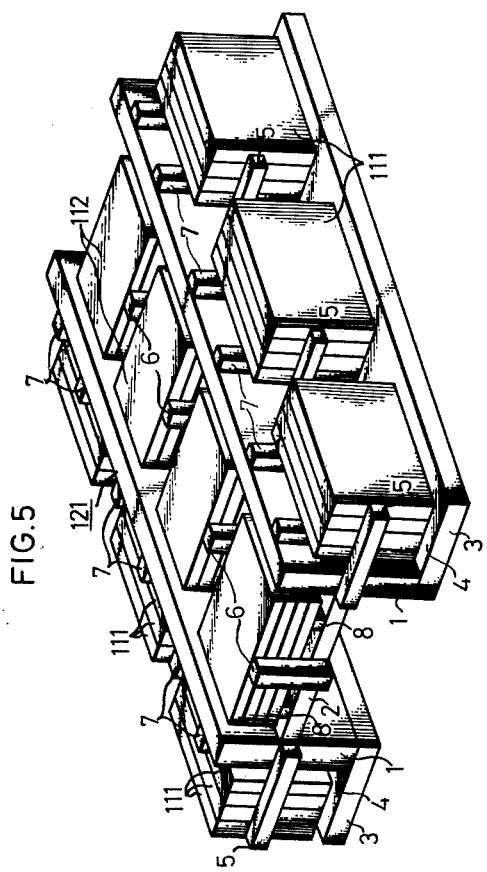
FIG. 5 is a partially cut-out perspective view illustrating the state where double plates are attached to the tool of the first embodiment.

The tool 121 is set on a delivery roller (not shown) disposed before the piercing mill so that it can extent in the lengthwise direction of the piercing mill. Then, as shown in FIG. 5, a plurality of outer flange double plates 111 are piled in the vertical direction in a pair of setting portions 4, and they are pushed toward the clearance fittings 7. At this point, the butting fittings 5 on the front end and outer side of the side plates 1 are caused to hit on and fall in contact with the front faces of the double plates 111 so that their positions are set in the arranged state. Then, the supporting rods 10 and fixed plates 11 are moved downwardly along the clearance fittings 7 to clamp the bolts 12 on the outer sides thereof, and simultaneously, the fixed plates 14 on the setting portions 4 are shifted toward the side plates 1. As a result, as shown in FIG. 4-A, the double plates 111 are fixed in the piled state to the outsides of the clearance fittings 7 by both the fixed plates 11 and 14. This fixing need not be tight but it may be to such an extent that the double plates 111 are temporarily fastened.

After fixing of the double plates 111 on the setting portions 4 has thus been completed, a plurality of web double plates 112 are placed in the horizontally piled state on a pair of the clearance fittings 8 on the supporting plate 2 in the rear of the butting fittings 6, so that the front face of each double plate 112 hits on and falls in contact with the butting fitting 6 located in the front. Then, the supporting rods 10 and fixed plates 11 are moved forwardly or backwardly along the clearance fittings 8, and the bolts 12 are clamped in the same manner as described above and the fixed plates 14 on both the front and rear ends of the supporting plate 2 are moved downwardly. As a result, as shown in FIG. 4-B, the double plates 112 are completely fixed on the clearance fittings 8 by the fixed plates 11 and 14.

After the double plates have thus been fixed on the tool 121 in the foregoing manner, the tool 121 with the double plates fixed thereto is fed on the supporting rollers 34 between both the movable and fixed gripping members 32 and 33 of the H-beam piercing drill. At this feeding operation, the position of the tool 121 on the piercing mill is determined by utilizing a positioning stopper for an H-beam mounted on the piercing mill, a reading scale mounted on the side of the delivery roller or a digital type automatic feed device.

When the tool 121 is fed onto the supporting rollers 34, a pair of setting plates 3 of the tool 121 are set on the rollers 34. Further, when the tool 121 is delivered onto the supporting rollers 34, the distance between the left and right supporting rollers 34 is adjusted in advance by forwarding or retreating the movable gripping member 33.

After the tool 121 has been placed between both the gripping members 32 and 33, the movable gripping member 33 is forwarded along the guide rail 24 so that the heel blocks 35 on the top ends of the gripping members 32 and 33 are caused to hit on the outsides of the double plates 111 on the respective setting portions 4 of the tool 121, whereby the tool 121 is fixed on the supporting rollers 34 and the double plates 111 are completely fixed to the tool 121.

Then, the left and right gear boxes are advanced while the drills 28 on the side faces thereof are being rotated, and the upper drills 36 are brought down while they are being rotated, whereby the double plates 111 on the outsides of the side plates 1 and the double plates 112 on the supporting plate 2 are simultaneously pierced and drilled. The hole arrangement is quite in agreement among the piled double plates.

The first piercing operation has thus been completed and the double plates in the rearmost portion of the tool 121 have thus been pierced. Then, in the same manner as described above, the tool 121 is shifted backwardly and the piercing operation is repeated. In this manner, all the double plates attached to the tool 121 can be pierced very simply. At any piercing operation, since the double plates are separated from the side plates 1 and supporting plate 2, the top ends of the drills 28 and 36 can be prevented effectively from hitting on the tool 121.

After piercing of the double plates, an H-beam to which the processed double plates are to be attached is placed on the supporting rollers 34 in the same manner as described above, and the positions of the upper and lower lateral drills 28 are brought down by the distance corresponding to the thickness of the setting plate 3 of the tool 121. Then, the H-beam is pierced, and the resulting hole arrangement is quite in agreement with that on the double plates.

In the above illustrated first embodiment of the present invention, in the case where there is adopted a center-shaking system in which the drills 28 of the multiple spindle piercing mill are moved symmetrically in the vertical direction with the center of the height of the flange portion of the H-beam, namely the center of the thickness of the web, being as the base point, the tool 121 is arranged so that as shown in FIG. 7, the fixed plates 14 on the setting portions 4 are attached to the lower-portions of the clearance fittings 7 so that their positions can be adjusted in the vertical direction as well as the fixed plates 11 on the upper portions of the clearance fittings 7, and a scale 37 is attached to the outer side face of each side plate 1. The point O of each scale 37 is set at the center of the supporting plate 2 of the tool 121. When double plates 111 are attached to the side plates 1 of such tool 121, the scales 37 are utilized so that the center of each double plate 111 in the lateral direction is in agreement with the center of the supporting plate 2.

When the above arrangement is adopted, since the drills 28 can be moved in the vertical direction with the center of the double plate being as the base point, and when an H-beam to which the double plates 111 are to be attached is pierced, the web center thereof can be used as the base point.

The second embodiment of the present invention will now be described by reference to FIGS. 8 and 9.

Figure 8:
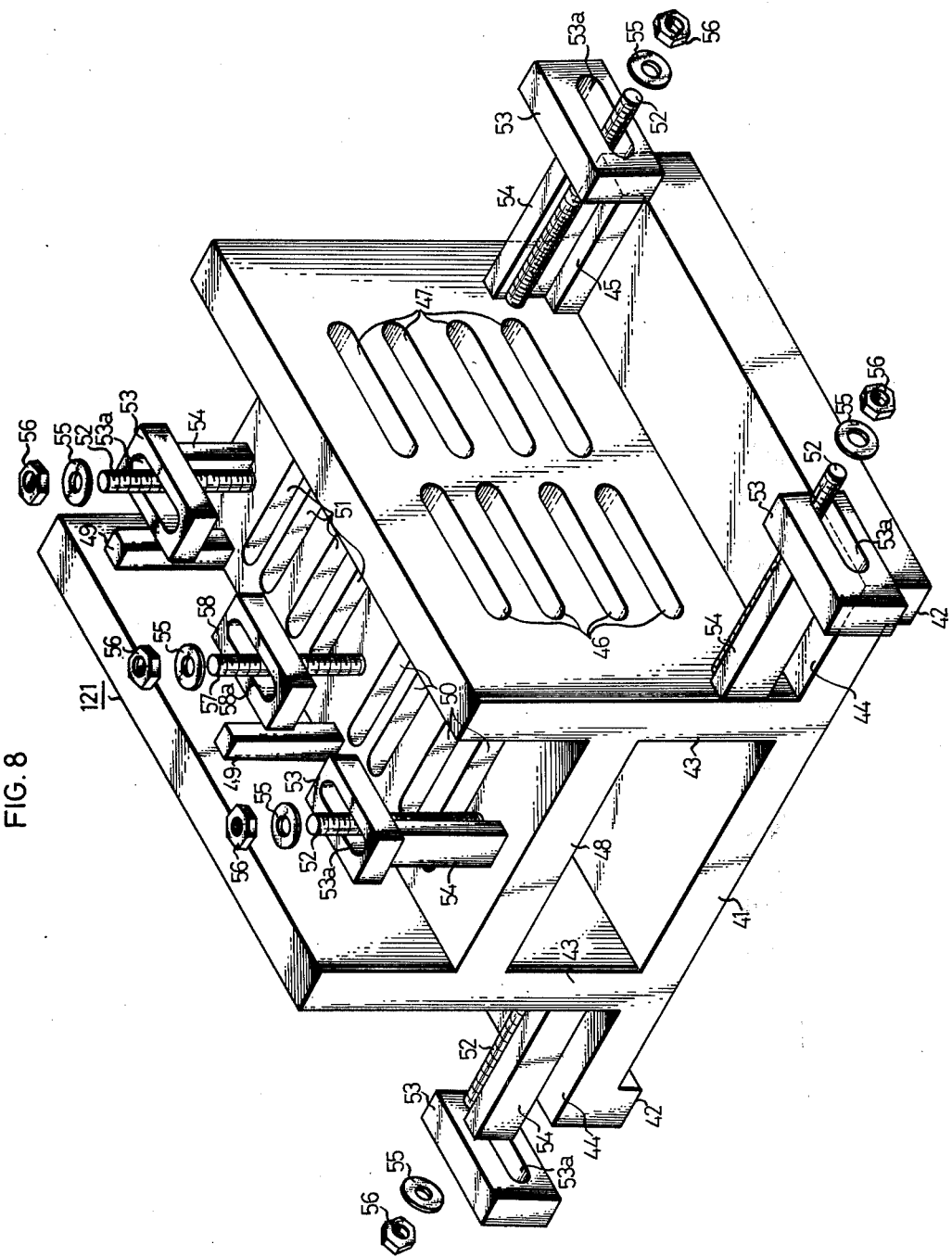
FIG. 8 is a perspective view illustrating a second embodiment of the tool of the present invention.
Figure 9:
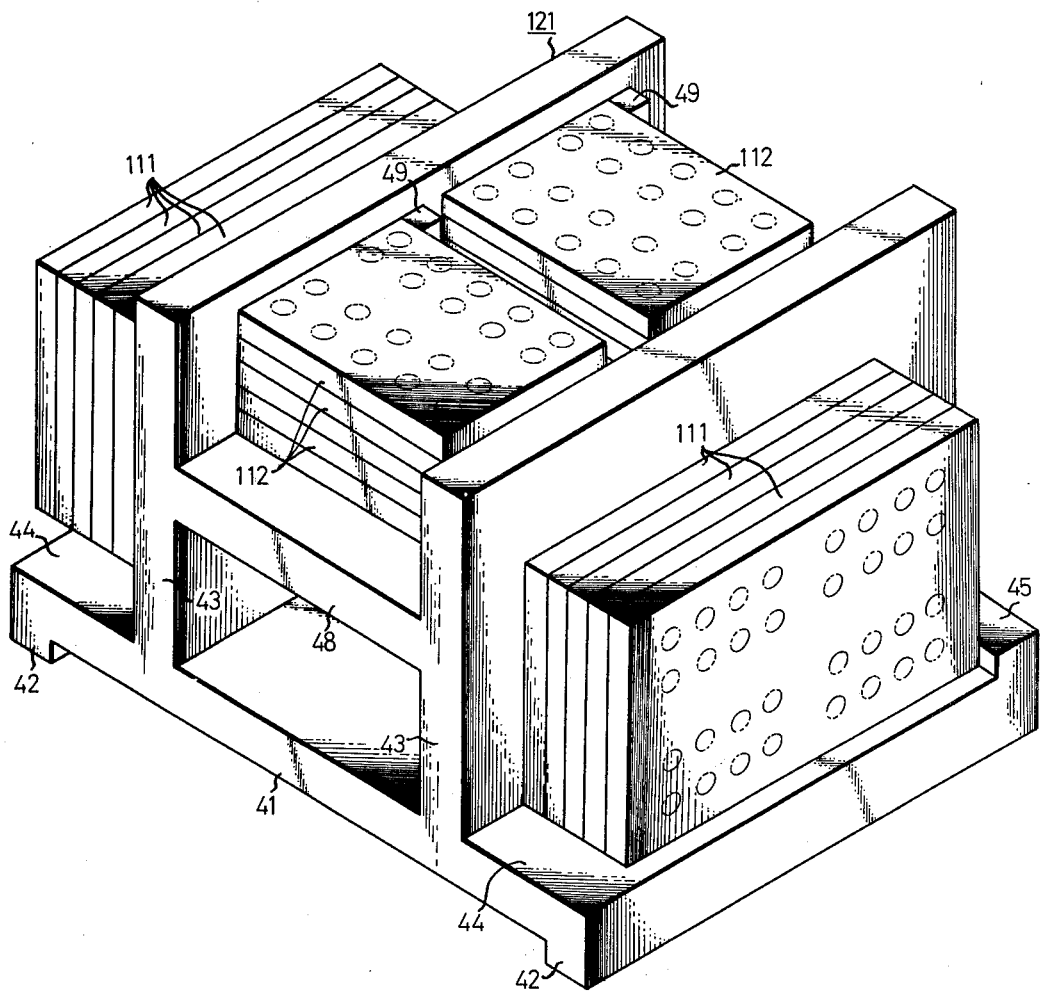
FIG. 9 is a partially cut-out perspective view illustrating the tool of the second embodiment together with double plates.

Referring to FIGS. 8 and 9, a pair of legs 42 extending in the front-rear direction are integrally formed on the lower faces of both the left and right ends of a rectangular base plate 41 of the tool 121, and a pair of vertically extending side plates 43 are disposed on both the left and right sides of the base plate 41. Both the sides of the base plate 41, that are extended outwardly over the side plates are designated as a pair of setting portions 44. Double plates 111 for connecting flange portions 102 of an H-beam 101 are set on these setting portions 44. Heel blocks 45 are projected from the rear end faces of the respective setting portions 44 to set the positions of the double plates 111 and they extend entirely along the lateral directions of the setting portions 44. Front piercing holes 46 and rear piercing holes 47 are formed on both the side plates 43 for escape of the drills. Each piercing hole is a long hole extending in the front-rear direction. These piercing holes 46 and 47 are arranged in four stages in the vertical direction and they are formed so that when the tool 121 of the present invention is first used, drill holes formed on the double plates 111 by the drills 28 of the multiple spindle H-beam piercing mill are continuous in the lengthwise direction. A supporting plate 48 is disposed in the horizontal direction between both the side plates 43 at a height corresponding to the center of the side plates 43 with respect to the height thereof so that the supporting plate 48 bridges both the side plates 43. This supporting plate 48 is formed to set thereon double plates 112 for connecting web portions 103 of the H-beam 101. Fittings 49 are disposed on the supporting plate 48 at the center of the left end portion and at the rear end. Each of the fittings 49 has a square columnar shape and falls in contact with the inside of the upper portion of the left side plate 43. These fittings 49 are disposed to set the positions of the double plates 112. Drill-escaping piercing holes 50 and 51 are formed on the supporting plate 48 in the front of the respective fittings 49. Each of these piercing holes is a long hole extending in the right-left direction. Also these piercing holes 50 and 51 are arranged in four stages, and like the above-mentioned piercing holes 46 and 47 formed on the side plates 43, these piercing holes 50 and 51 are formed so that when the tool 121 of the present invention is first used, the holes formed on the double plates 112 by the drills 36 are continuous in the right-left direction.

Pairs of bolts 52 are projected upwardly from the front and rear ends of the lower portions of the respective side plates 43 and from the front and rear ends of the central portion of the top face of the supporting plate 48, and a rectangular fixing plate 53 is attached to each bolt 52. A long hole 53a is formed on the central portion of each fixing plate 53 so as to allow the top end of the bolt to pass therethrough. Interposing members 54 having a square columnar shape are disposed between the fixing plates 53 and the side plates 43 or supporting plate 48. When these interposing members 54 are attached, by clamping nuts 56 to the bolts 52 through washers 55, they are gripped and fixed together with double plates between the fixing plates 53 and the side plates 43 or the supporting plate 48. The length of each interposing member 54 is made equal to the total thickness of the double plates piled on the outside of the side plate 43 or on the supporting plate 48. A bolt 57 similar to the above bolt 52 is projected on the supporting plate 48 between the front piercing holes 50 and the rear piercing holes 51 and it is located substantially at the center in the widthwise direction of the supporting plate. A fixing plate 58 similar to the fixing plate 53 is attached to the bolt 57. Namely, the top end of the bolt 57 is passed through a long hole 58a of the fixing plate 58 and a nut 56 is clamped to the bolt 57 through a washer 55, whereby the double plates 112 on the supporting plate 48 can be gripped and fixed.

The operation of piercing double plates by a multiple spindle H-beam piercing mill by utilizing the tool 121 having the above-mentioned structure will now be described.

As shown in FIG. 9, a plurality of double plates 111 for flange portions are set and piled on a pair of setting portions 44 of the tool 121, and they are pushed toward the side plates 43. At this point, the lower portions of the rear ends of the double plates 111 are caused to hit on and fall in contact with the heel blocks 45 on the rear ends of the setting portions 44, so that the double plates 111 are arranged in good order. After the double plates 111 have thus been piled and arranged, the fixing plates 53 are attached to the bolts 52 on both the front and rear ends of the side plates 43 so that the terminal portions of the fixing plates 53 on the side of the double plates 111 are caused to hit on and fall in contact with the outer side faces of the terminal portions of the double plates 111 located in the outermost positions. Simultaneously, the interposing members 54 are attached between the sides opposite to the double plates 111 and the outer sides of the side plates 43. Since the length of the interposing members 54 is the same as the entire thickness of the double plates 111, each fixing plate 53 is clamped toward the side of the side plate 43 in such a manner that it bridges the outer end of the interposing member 54 and the outer side of each double plate 111. Accordingly, both the front and rear ends of the double plates 111 are pressed toward the side plates 43 assuredly. Fixing of the double plates 111 onto the setting portions 44 may be such that the double plates 111 are temporarily fastened.

After completion of fixation of the double plates 111 onto the setting portions 44, a plurality of web double plates 112 are horizontally piled in the front and rear of the central bolt 57. At this time, the double plates 112 in both the front and rear of the central bolt 57 are caused to hit at their left side faces on the inner sides of the left side plate 43, and their rear ends on the left sides are caused to hit on the front faces of the butting fittings 49.

As at the time of clamping of the double plates 111, when the double plates 112 are camped, fixing plates 53 are attached to the bolts 52 on both the front and rear ends of the supporting plate 48, and nuts 56 are clamped to the bolts 52 through washers 55, whereby the front end top faces of the double plates 112 in the front and the rear end top faces of the double plates 112 in the rear are pressed downwardly and fixed through the fixing plates 53 and interposing members 54. At this point, also a fixing plate 50 is attached to the central bolt 57 in such a manner that it bridges the top faces of the double plates 112 in both the front and rear, and a nut 56 is clamped to the top end of the central bolt 57 through a washer 55. Accordingly, both the rear ends of the double plates 112 in the front and the front ends of the double plates 112 in the rear are simultaneously pressed downwardly, and therefore, both the front and rear ends of the double plates 112 in both the front and rear on the supporting plate 48 are pressed downwardly and all the double plates 112 can be fixed onto the supporting plate 48 assuredly.

After the double plates have thus been fixed onto the tool 121, the tool 121 with the fixed double plates are fed to the supporting rollers 34 of the multiple spindle H-beam piercing mill as in the above-mentioned first embodiment. In this case, a pair of legs 42 on the lower face of the base plate 41 of the tool 121 are placed on the supporting rollers 34. An arrangement is made so that when the tool 121 is fed onto the supporting rollers 34, the double plates 111 on the setting portions 44 of the tool 121 do not interfere with the heel blocks 35 of the gripping members 32 and 33.

After the tool 121 has been set between both the gripping members 32 and 33, the movable gripping member 33 is advanced along the guide rail 24 to cause the heel blocks 35 on the top ends of the respective gripping members 32 and 33 to hit on the outer sides of the double plates 111 on the respective setting portions 44 of the tool 121, whereby the tool 121 is completely fixed on the supporting rollers 34. In this case, it is necessary that the size of each of bolts 52 projected on the side plates 43 should be selected so that the bolts 52 do not hit on the gripping member 32 or 33.

As in the above-mentioned first embodiment, both the left and right gear boxes 22 and 26 are then advanced while the drills 28 on the sides faces thereof are being rotated, and the upper drills 36 are brought down while they are being rotated, whereby the double plates on the outer sides of the side plates 43 and the double plates 112 on the supporting plate 48 are simultaneously pierced. The hole arrangement is precisely in agreement among the piled double plates.

In this embodiment, the foregoing piercing operation is conducted 2 times in the front portion of the tool 121 and two times after the tool 121 has been advanced forwardly, namely 4 times as a whole. Thus, all the double plates attached to the tool 121 have been completely pierced. By these 4 piercing operations first conducted, piercing holes 46, 47, 50 and 51 are formed on both the sides plates 43 and the supporting plate 48 of the tool 121 by drilling.

Accordingly, at the subsequent operations, the drills 28 and 36 are freely inserted in the piercing holes 46 and 47 of the side plates 43 and the piercing holes 50 and 51 of the supporting plate 48 in the tool 121.

Figure 10:
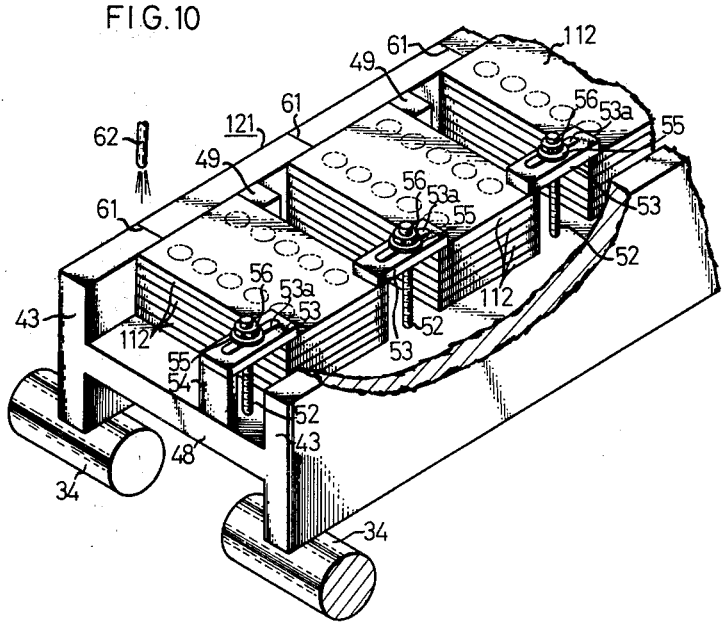
FIG. 10 is a perspective view illustrating a part of a third embodiment of the tool of the present invention together with double plates.

The third embodiment of the tool 121 of the present invention will now be described by reference to FIG. 10. The tool 121 of this embodiment is different from the tool 121 of the second embodiment in the point that the base plate 41 is omitted and only the double plates 112 for the web portion 103 are processed and also in the point that the entire system of the tool 121 is expanded in the front-rear direction.

In this third embodiment, the tool 121 comprises a pair of side plates 43 extending long in the front-rear direction and a relatively wide supporting plate 48 connecting the side plates 43 to each other substantially at the center in the vertical direction of the side plates 43.

A number of butting fittings 49 similar to the butting fittings 49 in the second embodiment are mounted in the left end portion of the supporting plate 48 at appropriate intervals, and fixing means for double plates 112, each including the above-mentioned bolt 52, fixing plate 53, washer 55 and nut 56, are disposed at positions corresponding to those of the butting fittings 49 in the right end portion of the supporting plate 48 and in both the front and rear end portions thereof. Also the interposing members 54 are used as means for fixing both the front and rear ends of the tool 121. In this third embodiment marking lines 61 extending in the thickness direction of the left side plate 43 are formed at appropriate intervals on the top face of the left side plate 43 of the tool 121, and a projector 62 is mounted at a position corresponding to the front row of the drills 36 of the piercing mill above the left side plate 43, so that rays are projected downwardly from the projector 62.

As will be apparent from the foregoing illustration, both the side plates 43 of the tool 121 are placed on the supporting rollers 34 of the H-beam piercing mill. In the tool 121 of this third embodiment, only the double plates 112 for the web portion can be placed and fixed onto the supporting plate 48 by registering the drilling points of the front row with the marking lines 61 on the top face of the left side plate 43. By moving forwardly or backwardly the tool 121 on the supporting rollers 34 of the multiple spindle H-beam piercing mill, a number of double plates 112 can be continuously processed. In this embodiment, positioning of the tool 121 is accomplished by stopping the movement of the tool 121 at such a point that the marking lines 61 are in agreement with rays projected from the projector 62.

Figure 11:
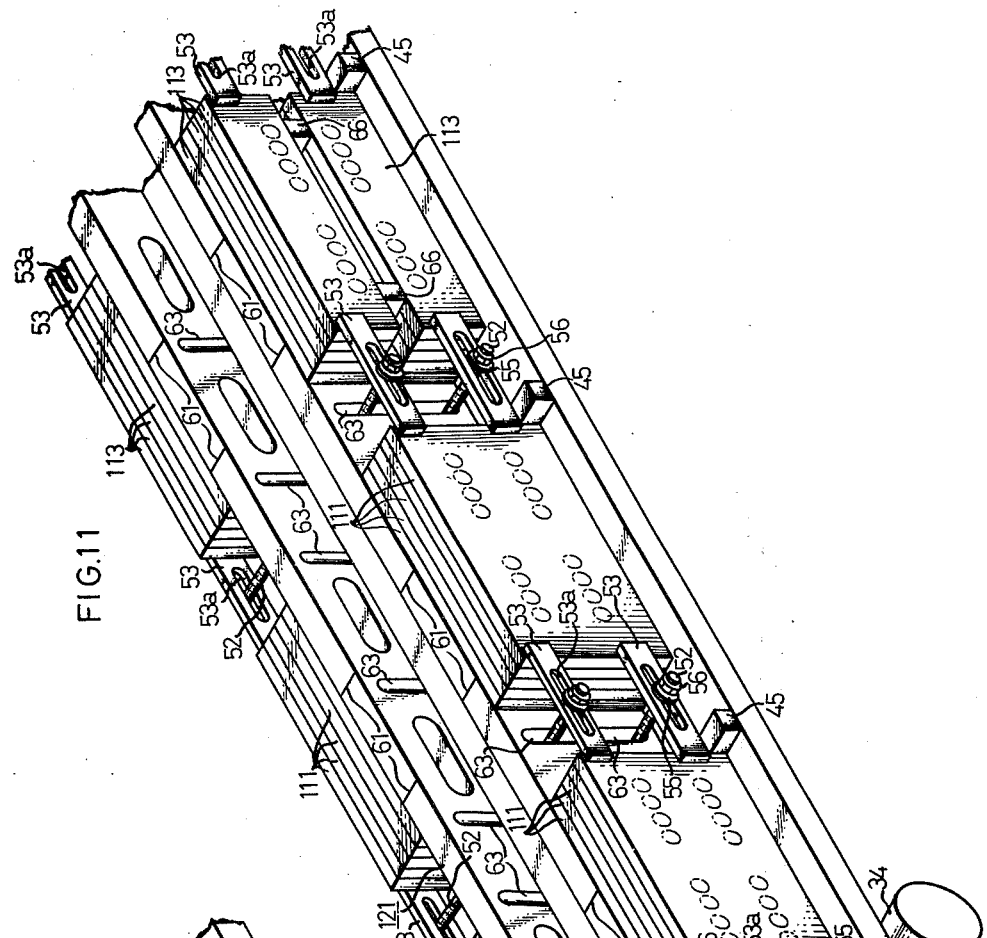
FIG. 11 is a perspective view illustrating a part of a fourth embodiment of the tool of the present invention together with double plates.

The fourth embodiment of the present invention will now be described by reference to FIG. 11. This embodiment is different from the above-mentioned second embodiment in the point that the base plate 41 is omitted between both the side plates 43 and the setting portions 44 are slightly broadened in the widthwise direction so that only outer double plates 111 and inner double plates 113 for the flange portions 102 can be processed, and also in the point that the entire length of the tool 121 is increased in the front-rear direction.

More specifically, the tool 121 of this embodiment comprises a pair of side plates 43 extending long in the front-rear direction, a supporting plate 48 connecting both the side plates 43 and broad setting portions 44 extending outwardly from the lower ends of both the side plates 43. A number of heel blocks 45 similar to the heel blocks 45 in the second embodiment are mounted on the setting portions 44 so that they are spaced from each other in the front-rear direction at appropriate intervals. Pairs of upper and lower long holes 63 extending in the vertical direction are formed on both the side plates 43 at positions corresponding substantially to the positions of the heel blocks 45 and on both the front and rear ends of the side plates 43. By inserting bolts 52 into the long holes 63 from the insides thereof so that their vertical positions can be adjusted, there are constructed fixing means for anchoring the double plates in the long holes 63. Also in the present embodiment, interposing members 54 are used as means for fixing both the front and rear ends of the tool 121. In this embodiment, drill-escape piercing holes are formed only in the upper and lower two rows on the side plates 43 between two adjacent long holes 63, and marking lines 61 similar to the above-mentioned marking lines 61 are formed on the top faces of both the side plates 43.

As will be apparent from the foregoing illustration, in the fourth embodiment, the setting portions 44 on the lower ends of both the side plates 43 of the tool 121 are placed on the supporting rollers 34 of the H-beam piercing mill, and only the double plates for the flange portions can be fixed onto the setting portions by registering the drilling points on the rear ends thereof with the marking lines 61. As in the third embodiment, the double plates can be continuously processed by moving the tool 121 on the supporting rollers 34 forwardly or backwardly. The positioning of the tool 121 is accomplished by registering the marking lines with the drills 28 on the frontmost row in the piercing mill. When inner double plates 113 for the flange portions are fixed to the tool 121 of this embodiment, a liner 66 is interposed between the double plates 113 of the lower stage and the double plates 113 of the upper stage.

Figure 12:
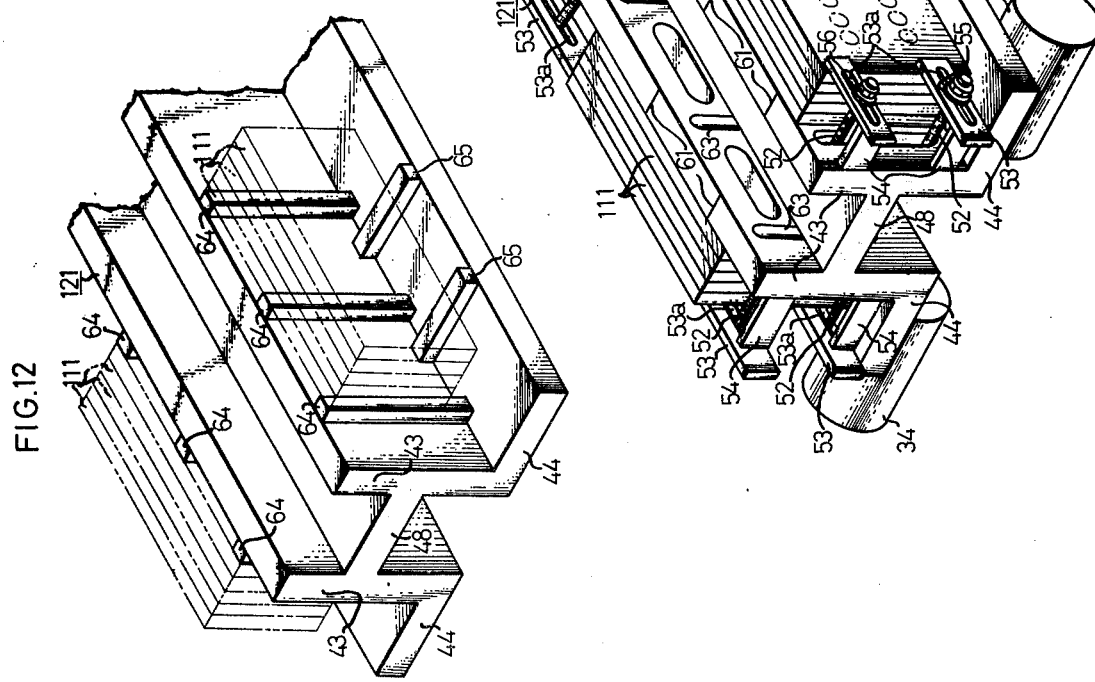
FIG. 12 is a perspective view illustrating a part of another example of the tool of the fourth embodiment.

A modification of the fourth embodiment will now be described by reference to FIG. 12. This modification is different from the fourth embodiment in the point that a number of drill-escaping clearance members 64 are mounted on the outer side faces of both the side plates 43 and a number of rectangular members 65 for supporting double plates are fixed onto the setting portions 44.

If such drill-escaping clearance members 64 are thus disposed, piercing holes need not be formed on the side plates 43, and when rectangular members 65 are disposed to support the double plates, even if the lower faces of the double plates are irregular and have convexities and concavities, the double plates can be supported relatively stably. In this modification, the clearance members 64 and rectangular members 65 may be formed separately from the side plates 43 and setting portions 44 of the tool 121 and they may be attached to the side plates 43 and setting portions 44 only when the tool 121 is actually employed.

In the foregoing first, second and fourth embodiments, the double plates are attached to the outer sides of the side plates 1 or 43 of the tool 121. However, the double plates may be fixed to the inner sides of the side plates 1 or 43. In each of the foregoing first, second, third and fourth embodiments, the top ends of the side plates 1 or 43 are projected upwardly over the supporting plate 2 or 48. Either or both of these projected portions of the side plates 1 or 43 may be omitted. If both the projected portions are omitted, the tool can be formed so that the cross-section thereof has a square shape. Further, butting fittings 5, 6 or 49 or heel blocks 45 need not always be disposed, but C clamps may be used as means for fixing double plates.

As will be apparent from the foregoing illustration, according to the method and apparatus of the present invention for piercing double plates for H-beams, double plates can be pierced promptly and precisely.

The present invention has been described in detail to some extent by reference to the preferred embodiments thereof. As will be apparent to those skilled in the art, various modifications can be made in a broad range within the scope of the spirit of the present invention, and the present invention is not limited to any specific embodiment other than those specified in the appended claims.

What we claim is:

1. A method for piercing double plates for H-beams by utilizing a multiple spindle H-beam piercing mill in which from at least two faces among both the side faces and the upper face the piercing operation is possible and a tool having a substantially H-shaped section and being capable of being set and supported on said piercing mill, said method comprising fixing double plates for an H-beam to at least one face among both the side faces and the upper face of said tool and piercing said double plates with the same drill arrangement as that to be used for piercing the H-beam to which said double plates are to be attached.

2. A method for piercing double plates for H-beam according to claim 1 wherein a tool having a substantial length is used as the tool and piercing of the double plates is carried out continuously.

3. A tool for processing double plates, which comprises a pair of vertical side plates to be set on supporting rollers of a multiple spindle H-beam piercing mill, a horizontal supporting plate connecting said side plates, a setting portion outwardly projected from the lower portion of at least one of said side plates, and fixing means for fixing double plates set on the top face of said setting portion.

4. A tool for processing double plates according to claim 3 which further comprises fixing means for fixing double plates set on the supporting plate.

5. A tool for processing double plates according to claim 4 wherein said fixing means for fixing double plates on the top face of said setting portion includes a plurality of bolts projected from the outer side of at least one side plate, fixing members clamped to the top ends of the respective bolts through nuts and interposing members disposed between the fixing members and the side plate, and said fixing means for fixing double plates set on the supporting plate includes a plurality of bolts projected from the top face of said supporting plate, fixing members clamped to the top ends of the respective bolts through nuts and interposing members disposed between said fixing members and said supporting plates.

6. A tool for processing double plates according to claim 4 wherein said fixing means for fixing double plates on the top face of said setting portion includes a plurality of supporting rods projected from the outer side of at least one side plate and fixing members fixed to the top ends of the respective supporting rods through bolts, and said fixing means for fixing double plates set on the supporting plate includes a plurality of supporting rods and fixing members fixed to the top ends of the respective supporting rods through bolts.

7. A tool for processing double plates according to claim 6 wherein the fixing members on the outer side of the side plate are arranged so that vertical positions of said fixing members can be adjusted with respect to said side plate.

8. A tool for processing double plates according to claim 6 wherein the fixing members on the supporting plate are arranged so that horizontal positions of said fixing members can be adjusted with respect to said supporting plate.

9. A tool for processing double plates according to claim 4 wherein drill-escaping means for preventing top ends of drills from hitting on the tool at the piercing operation is disposed at a desirable position between the side plate and the supporting plate.

10. A tool for processing double plates according to claim 9 wherein said drill-escaping means is disposed on each of the outer side of at least one side plate and the top face of the supporting plate.

11. A tool for processing double plates according to claim 9 wherein said drill-escaping means is disposed on each of at least one of said side plates and said supporting plate.

12. A tool for processing double plates according to claim 4 wherein supporting means is mounted on said setting portion to support double plates in the state floated on said setting portion.

13. A tool for processing double plates according to claim 12 wherein said supporting means includes a plurality of rectangular members mounted on the top face of at least one of said setting portions.

14. A tool for processing double plates according to claim 4 wherein positioning means for setting the positions of double plates is disposed at a desirable position on at least one of said side plates, supporting plate and setting portions.

15. A tool for processing double plates according to claim 14 wherein said positioning means is at least one butting fitting disposed on each of the outer side of at least one of said side plates and the top face of said supporting plate.

16. A tool for processing double plates according to claim 14 wherein said positioning means is at least one butting fitting disposed on each of the top face of at least one of said setting portions and the top face of the supporting plate.

17. A tool for processing double plates according to claim 4 wherein said supporting plate and at least one of setting portions are formed to have such a length that a number of double plates can be arranged in rows in the front-rear direction.

18. A tool for processing double plates according to claim 4 wherein marking lines are formed on the top face of at least one of said side plates to set the position of the tool with respect to a multiple spindle H-beam piercing mill.

* * * * *